J. BLASCHKE.
DOUGHNUT DIPPER.
APPLICATION FILED DEC. 13, 1918.
1,319,373.
Patented Oct. 21, 1919.
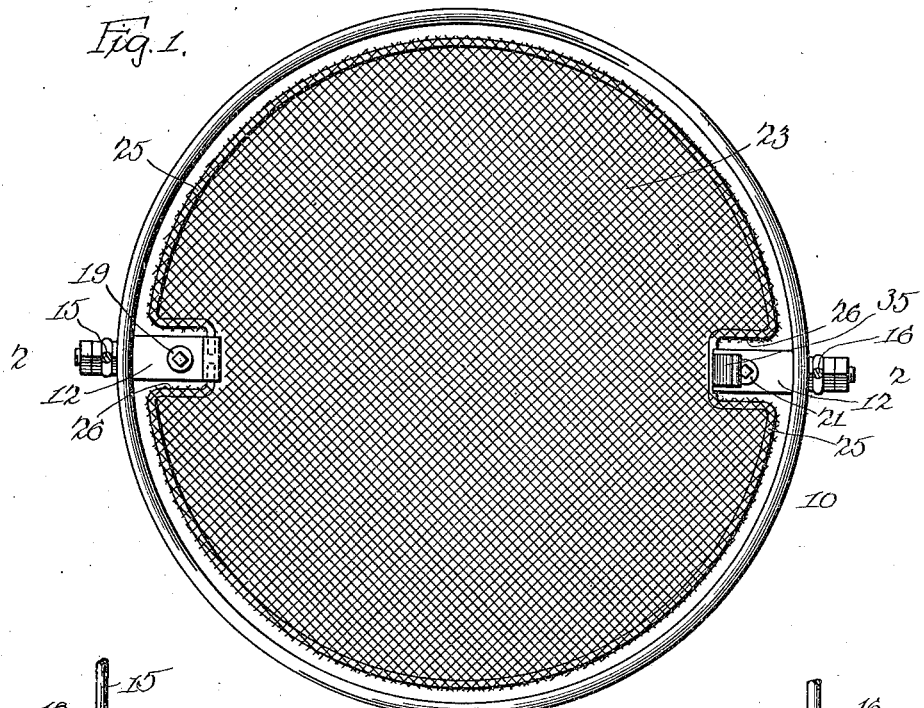
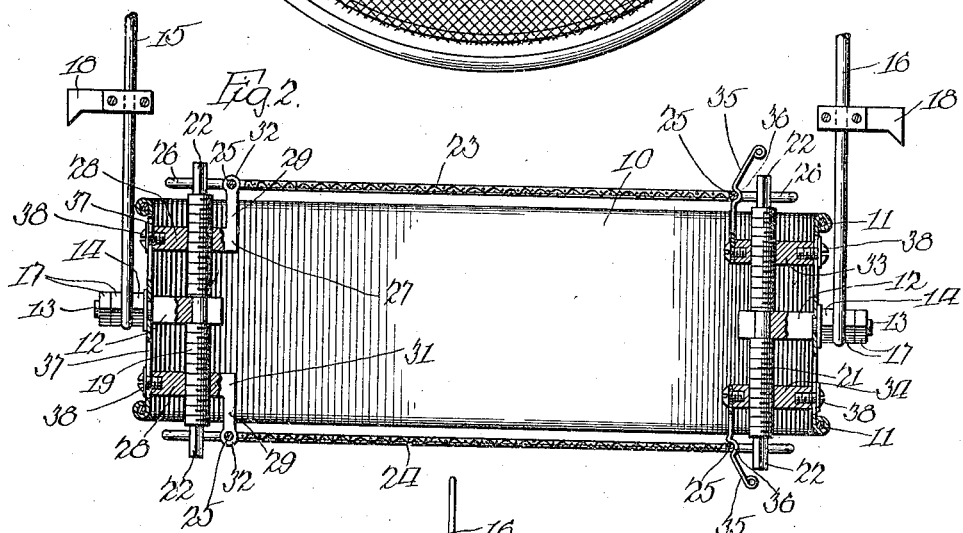
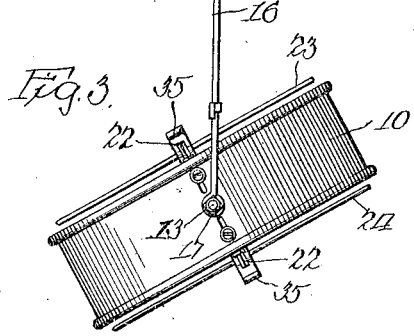
Inventor:
Julius Blaschke
by Robt Klotz
Atty.

UNITED STATES PATENT OFFICE.

JULIUS BLASCHKE, OF CHICAGO, ILLINOIS.

DOUGHNUT-DIPPER.

1,319,373. Specification of Letters Patent. Patented Oct. 21, 1919.

Application filed December 13, 1918. Serial No. 266,568.

*To all whom it may concern:*

Be it known that I, JULIUS BLASCHKE, a citizen of the Republic of Austria, residing at Chicago, in the county of Cook and State of Illinois, have invented certain new and useful Improvements in Doughnut-Dippers, of which the following is a specification.

My invention relates to doughnut dippers and has for its primary object the provision of an improved utensil of this character which shall have means whereby its capacity may be varied at will. A further object is the provision of upper and lower covers hinged in place and adjustable toward and from each other while permitting their being opened and closed in any adjusted position.

Other objects and advantages of the invention will appear from the following description, taken in conjunction with the accompanying drawings which form a part of this specification and illustrate the preferred embodiment of the invention.

Due to the demand of the consuming public for doughnuts of various sizes from very small or very large, considerable difficulty has been experienced by bakers in the frying of these articles by immersion in hot fat due to the fact that doughnut dippers commonly found on the market are of an invariable interior capacity so that, when partially cooked and turned over by inversion of the dipper, the doughnuts fall to one side of the dipper and are mutilated. One of the advantages of the present invention is that it may be so adjusted that it will exactly contain the doughnuts without undue pressure upon them during the cooking and without leaving a large empty space within the utensil to permit the product to shift about within the dipper during inversion; this advantage holding good regardless of the size of doughnuts being made.

In the drawings:

Figure 1 is a plan view of my invention with the upper end of the bail sectioned away for clearness.

Fig. 2 is a section taken approximately on line 2—2 of Fig. 1.

Fig. 3 is a side elevation of the invention illustrating a position it occupies during inversion when the doughnuts are partially cooked, part of the bail being broken away also in this view.

Reference numeral 10 indicates a cylindrical encircling wall of metal having its ends open and preferably strengthened in the well-known manner by being bent over stiffening rings 11. At diametrically opposite sides of the wall and midway between its ends, are positioned a pair of spindle bearings 12 passing through apertures formed in the wall and having each a spindle hole drilled parallel with the axis of wall 10 at a point spaced inwardly from the wall. A threaded shank 13 projects outwardly of the wall from each spindle bearing and carries a nut 14 by means of which the bearing is fixed in position. The legs 15 and 16 of a bail are pivotally engaged by shanks 13, and lock nuts 17 are threaded upon the shanks outwardly of these bail legs to retain the legs on the shanks. Obviously the wall 10 is free to rotate about its diameter in the bail. In order to conserve space the upper end of the bail is omitted from the drawings, but it may be of any suitable form. The bail legs are preferably each provided with a hook 18 out-turned from wall 10 and adapted to rest upon the upper edge of a kettle.

Centrally journaled in each of the spindle bearings 12 is a screw threaded spindle, numbered 19 on the left side in Figs. 1 and 2, and 21 on the right side. These spindles are parallel to each other and to the axis of wall 10 and are preferably somewhat spaced from the inner surface of the wall. Above this spindle bearing each spindle is provided with a right hand thread, while below the bearing it carries a left hand thread. Each spindle is rotatable in its bearing but does not travel longitudinally therein. A squared key stem 22 is provided at each end of each spindle by means of which the spindle may be rotated in its bearing.

The ends of wall 10 are closed by upper and lower covers 23 and 24 respectively, these covers being preferably formed of screening stretched upon a heavy frame wire 25. In the vicinity of each spindle the frame wire 25 is inbent as indicated at 26 for the accommodation of the spindle and certain parts carried thereby. A hinge member generally indicated by numeral 27 and comprising a nut portion 28 and an upstanding arm 29 integral therewith, is threaded upon the upper right hand thread of spindle 19 so that by rotation of the spindle the hinge member travels longitudinally of wall 10. A substantially identical hinge member 31 travels upon the lower left hand thread of spindle 19. Arm 29 is in each instance provided with a hinge bearing 32 which is pivotally engaged by frame wire 25. Upper and lower covers 23 and 24 are therefore hinged to members 27 and 31 respectively at one side of the doughnut dipper.

Upper and lower nuts 33 and 34 are respectively threaded upon the upper right hand and lower left hand threads of spindle 21, and, upon rotation of the spindle, are moved synchronously toward or from each other in a line parallel to the axis of wall 10, in the same manner as hinge members 27 and 31 are moved. Inwardly of spindle 21 each nut 33 and 34 carries an out-turned spring latch 35 which is curved as at 36 to snap upon frame wire 25 of the respective covers 23 and 24. Each spring latch is positioned diametrically opposite the hinged point of its respective cover and exerts pressure on the cover in a direction toward the hinge member 32; curve 36 being of sufficient extent so that it overlies a considerable portion of the surface of wire 25, retaining that wire against movement about the hinge bearing 32.

As a means of bracing the cover supporting structures, the wall 10 is longitudinally slotted as at 37 opposite the threads of each spindle. Nuts 28, 33 and 34 all extend from their respective spindles into contact with the inner surface of wall 10 on opposite sides of the adjacent slots 37, and a set screw 38 in each instance has its head bearing against the outer surface of wall 10 and its shank passing through a slot 37 and threaded into a tapped aperture provided in each of nuts 28, 33 and 34. Preferably covers 23 and 24 are supported solely in each instance by hinge bearing 32 at one side and the spring latch 35 at the other. It will be noted that because of the inbent portions 26 of wire 25, each cover clears both the spindles and the adjacent nuts upon the spindles.

In the operation of my invention, one of the latches 35 is bent away from its engagement with wire 25, and cover 23, for example, is opened about its hinge axis in bearing 32, the interior of the doughnut dipper defined by wall 10 and lower cover 24 being packed with freshly cut doughnuts in the uncooked dough form. Assuming that the operator is frying small-sized doughnuts, it may happen that when a sufficient number have been placed in the doughnut dipper, a considerable space will still remain between the upper level of the doughnuts and cover 23, so much space, for example, that, when the dipper is inverted upon the diameter defined by shanks 13, the doughnuts would have ample room in which to shift about within the dipper and become mutilated thereby. In such an event, it becomes necessary for the operator to decrease the interior capacity of the doughnut dipper. This is accomplished by applying a key to the squared key stem 22 of each spindle 19 and 21 and rotating these spindles to move hinge members 27 and 31 toward each other and nuts 33 and 34 toward each other. Such rotation of the spindles may be continued until cover 23—now closed by engagement with latch 35—is very close to or in contact with the top of the body of uncooked doughnuts within the dipper. The dipper with its contents is now immersed in a kettle of hot fat, hooks 18 resting upon the upper edge of the kettle. After the cooking process has continued for a given length of time, it is necessary that the doughnuts be turned over in the fat, this process being accomplished by the simple act of revolving the dipper within the bail legs 15 and 16 about its diameter defined by shanks 13; Fig. 3 illustrating the manner in which it is inverted. When the doughnuts are thus half cooked, they may have swelled so as to completely fill the interior of the dipper, whereupon the capacity of the dipper may be enlarged by a rotation of spindles 19 and 21 in the direction reverse to that just above described, thus causing members 27 and 31 to travel synchronously from each other and nuts 33 and 34 and their latches 35 to travel also synchronously from each other. When the doughnuts are cooked that cover which stands uppermost may be swung open and the finished doughnuts removed. Inasmuch as the doughnuts commonly cooked in quantities in hotels and bakeries do not swell to any great extent during the cooking process, it will normally be necessary to vary the interior capacity of the doughnut dipper only when the size of the doughnuts to be cooked is changed. It is, of course, necessary at each rotation of spindles 19 and 21 to loosen the set screws 38, so that nuts 28, 33 and 34 may travel longitudinally of wall 10. Upon adjustment of these nuts, the set screws are again tightened thereby bracing the cover supporting devices firmly against wall 10.

It will be noted that regardless of the adjusted positions of hinge members 27 and 31 and latches 35, each cover is free to swing to fully open position by reason of the fact that frame wire 25 is inbent to clear these parts. For convenience in description, covers 23 and 24 have been designated as "upper" and "lower" respectively, but they are identical in construction and interchangeable from top to bottom of the dipper according to its rotation about its diameter.

While I have illustrated and described the preferred embodiment of my invention, it will be obvious that one skilled in the art may make modifications thereof, without departing from the spirit of the invention. I wish, therefore, not to be restricted to the precise embodiment shown, except in so far as the same is limited in the appended claims.

I claim:

1. The combination with an encircling wall, of an end closure therefor, and a hinge member adjustable axially of the wall, mounted thereon and hingedly connected with said end closure.

2. The combination with an encircling wall, of an end closure therefor, and means for mounting the same comprising a hinge member, and a latch device both of which are adjustable axially of said wall and support the closure.

3. The combination with an encircling wall, of an end closure therefor, a rotatable screw spindle supported from the wall, and a hinge member threaded upon the spindle and hingedly connected to said closure.

4. The combination with an encircling wall, of an end closure therefor, parallel rotatable screw spindles supported from the wall, a hinge member threaded upon one of said spindles and to which the closure is hingedly connected, and a latch device threaded upon the other spindle and shaped to retain and support the closure by removable engagement therewith.

5. The combination with an encircling wall, of parallel screw spindles rotatably carried thereon, a hinge member threaded upon one spindle, a nut threaded upon the other spindle, an end closure for the wall hingedly connected to said member, and a spring latch carried on the nut, snapped upon said closure, and exerting pressure thereon to prevent its hinging movement.

6. The combination with an encircling wall, of opposite spindle bearings projecting rigidly therefrom, a pair of parallel screw threaded spindles spaced from the wall and mounted for rotation each in one of said bearings, a nut threaded upon each spindle and extending into sliding contact with the wall, said wall being slotted opposite each spindle, and a set screw for each nut having its head bearing against the outer surface of the wall and its shank passing through the aperture and threaded into a laterally disposed tapped aperture formed in the nut.

7. The combination with an encircling wall, of opposite end closures therefor, and means for supporting said closures from the wall whereby the closures are synchronously movable toward and from each other.

8. The combination with an encircling wall, of end closures therefor, and means for mounting said closures comprising a pair of spaced spindles paralleling the axis of the wall and journaled at their centers for rotation, each spindle having its upper end right threaded and its lower end left threaded, a hinge member mounted to travel upon each thread of one spindle and a spring latch mounted to travel on each thread of the other spindle, each closure being hingedly connected to one of said hinge members, and one of said spring latches engaging each closure.

9. A doughnut dipper, comprising an encircling wall, and a pair of opposite parallel end closures for the same, said closures being movable in parallelism toward and from each other.

10. A doughnut dipper, comprising an encircling wall, and a pair of opposite parallel end closures for the same, said closures being movable in parallelism toward and from each other, of less diameter than the interior diameter of said wall, and movable within the wall.

In testimony whereof I have affixed my signature.

JULIUS BLASCHKE.

Copies of this patent may be obtained for five cents each, by addressing the "Commissioner of Patents Washington, D. C."